United States Patent
Busiashvili

(10) Patent No.: US 11,820,384 B1
(45) Date of Patent: Nov. 21, 2023

(54) METHOD TO DIAGNOSE REAL TIME PULSELESS CONDITION OF A DRIVER OPERATING A VEHICLE

(71) Applicant: Stat Capsule Inc., Glendale, CA (US)

(72) Inventor: Yuri Busiashvili, Los Angeles, CA (US)

(73) Assignee: Stat Capsule Inc., Glendale, CA (US)

( * ) Notice: Subject to any disclaimer, the term of this patent is extended or adjusted under 35 U.S.C. 154(b) by 0 days.

(21) Appl. No.: 18/183,573

(22) Filed: Mar. 14, 2023

(51) Int. Cl.
*B60W 40/08* (2012.01)
*B60W 60/00* (2020.01)
*B60W 50/14* (2020.01)

(52) U.S. Cl.
CPC ............ *B60W 40/08* (2013.01); *B60W 50/14* (2013.01); *B60W 60/0015* (2020.02); *B60W 60/0051* (2020.02); *B60W 2050/143* (2013.01); *B60W 2050/146* (2013.01); *B60W 2422/50* (2013.01); *B60W 2540/221* (2020.02)

(58) Field of Classification Search
None
See application file for complete search history.

(56) References Cited

U.S. PATENT DOCUMENTS

| | | | |
|---|---|---|---|
| 5,769,085 A | 6/1998 | Kawakami et al. | |
| 6,822,573 B2 | 11/2004 | Basir et al. | |
| 7,397,382 B2 | 7/2008 | Ikegami et al. | |
| 8,106,783 B2 | 1/2012 | Wada et al. | |
| 9,124,955 B2 | 9/2015 | Geva et al. | |
| 9,409,517 B2 | 8/2016 | Han et al. | |
| 9,855,945 B2 | 1/2018 | Fung et al. | |
| 9,993,191 B2 | 6/2018 | Lian | |
| 10,015,649 B2 | 7/2018 | Ulmansky et al. | |
| 11,331,025 B2 | 5/2022 | Yoon et al. | |
| 2008/0143504 A1 | 6/2008 | Martin Alvarez | |
| 2009/0209829 A1 | 8/2009 | Yanagidaira et al. | |
| 2010/0130808 A1* | 5/2010 | Hattori | B60H 1/2218 219/202 |

(Continued)

FOREIGN PATENT DOCUMENTS

WO 2019027389 2/2019

OTHER PUBLICATIONS

Branko Babusiak, Adrian Hajducik, Stefan Medvecky, Michal Lukac, Jaromir Klarak, Design of Smart Steering Wheel for Unobtrusive Health and Drowsiness Monitoring, Aug. 5, 2021.

*Primary Examiner* — Tamara L Weber
(74) *Attorney, Agent, or Firm* — Ralph D Chabot

(57) ABSTRACT

A vehicle having a vehicle cabin, a steering wheel adapted to include at least one sensor to measure arteriolo-capillary pulse wave intervals of a driver when the steering wheel is gripped by the driver, a computer, a proximity sensor system, rear tail lights, navigation system and an audio system, wherein the steering wheel, at least one sensor, proximity sensor system, rear tail lights navigation system and audio system are each operably connected to the computer; and when the steering wheel is gripped by the driver, communicating the arteriolo-capillary pulse wave intervals of the driver to the computer to determine whether the driver is experiencing a pulseless condition and if a pulseless condition exceeding about six seconds is determined, the computer will assume control of the vehicle and using the vehicle navigation system, bring the vehicle to a controlled stop.

4 Claims, 1 Drawing Sheet

(56) References Cited

U.S. PATENT DOCUMENTS

| | | |
|---|---|---|
| 2010/0295707 A1 | 11/2010 | Bennie et al. |
| 2014/0275834 A1 | 9/2014 | Bennett |
| 2016/0001781 A1* | 1/2016 | Fung .................. G07C 9/37 |
| | | 701/36 |
| 2018/0348759 A1* | 12/2018 | Freeman .............. A61N 1/3904 |
| 2019/0139411 A1* | 5/2019 | Dhull .................... B60Q 1/324 |
| 2019/0202467 A1* | 7/2019 | Sun ....................... B60W 50/14 |
| 2019/0316922 A1* | 10/2019 | Petersen ................ A61B 5/165 |
| 2020/0342756 A1* | 10/2020 | MacKenzie ............. G08G 1/16 |
| 2020/0383580 A1 | 12/2020 | Shouldice et al. |
| 2021/0016805 A1 | 1/2021 | Oba et al. |
| 2021/0232901 A1* | 7/2021 | Rundo .................. G06N 3/045 |
| 2022/0164026 A1 | 5/2022 | Sicconi et al. |
| 2022/0402502 A1* | 12/2022 | Neagu Chivu ...... G06V 20/597 |

* cited by examiner

METHOD TO DIAGNOSE REAL TIME PULSELESS CONDITION OF A DRIVER OPERATING A VEHICLE

BACKGROUND OF THE INVENTION

Life begins with the first heart beat, or first spark; an electrical signal generated in the heart that travels through the conduction system and activates the heart muscle. This is an electro-mechanical event called cardiac cycle. The heart does not stop throughout the life cycle. Towards the seventh to eighth decade of life, the generator of this electrical spark, a natural pacemaker, in some individuals does not function as reliably as earlier in life. This lack of reliable function can be sick sinus syndrome, or an electrical impulse gets stuck in the conductive system, the condition called atrioventricular block. In these conditions, the heart muscle doesn't get activated and the heart goes silent. Most of the time, the natural pacemaker will recover its function within seconds spontaneously. If not, the affected heart goes "silent", a condition called cardiac standstill. If cardiac silence and no pulse condition extends beyond 7-10 seconds, an individual loses consciousness.

If cardiac standstill continues for 15 seconds, it is termed cardiac arrest. The odds of re-starting the electro-mechanical heart activity diminish with every subsequent second of cardiac silence, or standstill. The American Heart Association (AHA) recommends implantation of electronic pacemaker if the cardiac silence is documented to exceed 3 seconds.

The pause, or electro-mechanical silence has to be identified. For this purpose, there are cardiac monitors that are used for days and weeks to identify potential candidates for an artificial pacemaker. Electrical activity of the heart is monitored; no electrical activity translates into no mechanical contraction. Mechanical activity usually is monitored in a hospital setting where activity can be monitored by arterial line; directly reflecting arterial blood pressure fluctuations.

The heart conditions mentioned earlier can manifest itself in situations most dangerous to the individual. One of these situations can occur when a driver of a vehicle suffers a cardiac condition.

For example, cardiac conditions such as a pulseless condition, Brady-arrhythmia or tachyarrhythmia can be experienced by an elderly driver and can easily go undetected. These types of cardiac conditions can potentially result in full cardiac arrest which can be a life-threatening situation to both the driver as well as other people in proximity; particularly if the driver were to lose the mental and physical capability to control the vehicle.

Many modern vehicles are equipped with technology including a computer, proximity sensor systems, cameras, heads-up display (HUD) and mobile GPS navigation which can allow a vehicle so equipped to be controlled by the computer based on information it receives regarding the vehicle location, speed and proximity of nearby objects.

Photoplethysmography (PPG) is an uncomplicated and inexpensive optical measurement method that is often used for heart rate monitoring purposes. It is also a modality that can detect the loss of a mechanical pulse wave and is a good indicator of a pulseless condition. PPG sensors have been widely used in many types of devices such as attachments to ear lobes and fitness style watches.

A pulseless condition can lead to full cardiac arrest. After the heart goes "silent" for a few cardiac cycles, peripheral blood flow in the brain drops to zero and the individual loses conscience usually after about 6-7 seconds or 6-7 missed cardiac cycles. Further complicating this situation, it is not uncommon for an individual experiencing a pulseless condition to regain a heart beat frequency less than every three seconds. Nevertheless, a pulseless condition is a condition which should be evaluated by medical personnel as soon as possible.

SUMMARY OF THE INVENTION

Disclosed is a method for using a PPG sensor as a diagnostic and safety aid for vehicular drivers. PPG is a very fast and reliable method for monitoring a person's arteriolo-capillary pulse wave intervals.

The term "pulseless condition" is defined as any time interval between heart beats in excess of a first pre-determined time interval. This first pre-determined time interval is preferably three seconds which coincides with the American Heart Association (AHA) recommendation for pacemaker implantation.

The invention can be used not only to monitor the heart condition of the driver, but can also be utilized to control activities of the vehicle after a pulseless condition has been diagnosed for the driver by the on-board computer.

For example, after a driver has been diagnosed with a pulseless condition over the first pre-determined time interval, such as over three seconds, the on-board computer can alert the driver of his condition. This alert can take the form of audio, visual or both. An audio alert can inform the driver to proceed to a medical facility for evaluation. The on-board computer can calculate the driving directions based on GPS position of the vehicle in relation to a nearby medical facility. Audio can be used to provide step-by-step directions.

However, if the driver's pulseless condition worsens in which the time interval between heart beats exceeds a second pre-determined time interval that is indicative of the driver about to lose consciousness, such as about six seconds, individuals following immediately behind the driver are in danger because they are traveling behind a driver about to lose control of his vehicle. As a warning to those individuals, the on-board computer after diagnosing a pulseless condition exceeding the second pre-determined time interval, for example, can be programmed to activate the rear tail lights in a specific pattern which can alert individuals driving behind of a problem with the vehicle they are following. In addition, if the driver is incapacitated, the on-board computer can take control of the vehicle and perform steps necessary to maneuver and safely bring the vehicle to a stop on the side of the road.

Additionally, if the vehicle is properly equipped, an inhalant medication may be dispensed to the driver and can be programmed to be discharged after the first pre-determined time interval, second pre-determined time interval, or at some other time.

My method and system provides for the safety of individuals, including the driver who may experience a pulseless condition.

In one embodiment of use of my system, a vehicle is provided to perform the functions required by the invention. Such a vehicle would have GPS navigation, a video display, a proximity sensor system that is used for collision avoidance and may incorporate multiple cameras around the periphery of the vehicle; all of which are operably connected to the on-board computer which is also connected to alert mechanisms such as the vehicle lights, sound system and possibly a system for release of medication to the driver.

Besides having the aforementioned equipment, the vehicle would further be equipped with at least one PPG sensor for monitoring the arteriolo-capillary pulse wave intervals of the driver. In a preferred embodiment, the at least one PPG sensor is positioned on or around the steering wheel and is also operably connected to the on-board computer. The at least one PPG sensor is positioned on areas of the steering wheel most likely to be gripped by the driver. Preferably, the at least one PPG sensor is positioned circumferentially about the steering wheel. Because different drivers can grip the steering wheel differently, the at least one PPG sensor should be located on those areas of the steering wheel typically gripped by the driver.

The vehicle's computer would be programmed to process arteriolo-capillary pulse wave intervals received from the at least one PPG sensor and determine whether the driver is experiencing pulseless condition.

Where the at least one PPG sensor is part of the steering wheel, it is necessary that the driver have at least one hand on the steering wheel positioned to be in contact with the PPG sensor. To ensure the driver maintains at least one hand on the steering wheel, an audible sound or visual signal may activate before the first pre-determined time interval occurs as a warning to the driver to place a hand on the wheel to prevent a false diagnosis of a pulseless condition.

In one embodiment of my method, once a pulseless condition is diagnosed by the on-board computer represented as the first pre-determined time interval, the computer can initiate one or more of the following: a) inform the driver of his cardiac condition and recommend traveling to the nearest medical facility for evaluation; or b) provide directions to a nearby medical facility based on the GPS location relative to the vehicle. In a preferred embodiment, the vehicle display can be a heads-up-display (HUD) which would show a message to suggest placing both hands on the steering wheel while driving, to be able to obtain more reliable heart information so that real-time arteriolo-capillary pulse wave intervals and possibly an optional sensor capable of being used to generate an ECG rhythm strip in which both sets of data can be wirelessly transmitted by the vehicle to a medical facility.

If the driver's condition worsens to having a pulseless condition exceeding the second pre-determined time interval, my invention can include at least one selected from the group consisting of: c) the on-board computer will activate the rear lights of the vehicle in such a way to alert drivers behind and in close proximity of the condition of the driver of the vehicle; d) take over control of the vehicle to safely maneuver and slow the vehicle until a safe destination is reached; and e) if the vehicle is equipped, dispensing an inhalant medication within the vehicle cabin to treat the driver.

The medication described in e) for example, can be a cannister or capsule containing an ammonia inhalant that can be installed within the vehicle cabin; such as on the center of steering wheel. A mechanism would be provided to either release the ammonia vapor from the cannister or to crush the ammonia inhalant capsule. Either mechanism would be operably coupled to the on-board computer. The release of ammonia vapor into the vehicle cabin directly in front of the driver's nose, would cause an olfactory unconditional adrenergic reflex that would be administered to prevent full loss of consciousness.

Also, it is possible that after diagnosis of a pulseless condition, the driver will regain pulse spontaneously. In this case, the on-board computer can be programmed to discontinue the steps described earlier.

As used in the claims, the first pre-determined time interval of about 3 seconds means between 3.0-3.5 seconds. The second pre-determined time interval of about 6 seconds means between 6.0-7.5 seconds.

In some aspects, the techniques described herein relate to a method for diagnosing whether a driver of a vehicle is experiencing a pulseless condition, the method which includes: a) providing a vehicle having a vehicle cabin, a computer, a steering wheel adapted to include at least one sensor to communicate to the computer, arteriolo-capillary pulse wave intervals of a driver when the steering wheel is gripped by the driver, a proximity sensor system, a visual display, rear tail lights, navigation system and an audio system, wherein the steering wheel, at least one sensor, proximity sensor system, rear tail lights and audio system are each operably connected to the computer; and, b) if the steering wheel is gripped by the driver, communicating the arteriolo-capillary pulse wave intervals to the computer for the computer to determine whether the driver is experiencing a pulseless condition diagnosed as a time interval between consecutive arteriolo-capillary pulse wave intervals of the driver exceeding a first pre-determined time interval.

In some aspects, the techniques described herein relate to a method in which the first pre-determined time interval is about three seconds.

In some aspects, the techniques described herein relate to a method further including instructions provided to the driver to navigate to a medical facility as selected by the computer based upon GPS location by either audio, visual display or both, if the first pre-determined time interval has been exceeded.

In some aspects, the techniques described herein relate to a method further including: continued communicating from the at least one sensor to the computer the time interval between arteriolo-capillary pulsations of the driver for the computer to determine whether the driver is experiencing a pulseless condition diagnosed as the time interval between heart beats of the driver in excess of a second pre-determined time interval and if the second pre-determined time interval is exceeded, preform at least one selected from the group consisting of: c) activating the rear tail lights; d) switching control of the vehicle from the driver to the computer; and, e) discharging an inhalant medication within the vehicle cabin to treat the driver.

In some aspects, the techniques described herein relate to an improved vehicle to be operated by a driver having a vehicle cabin and powered by an internal combustion engine, electric batteries, or both and which includes a steering wheel, a visual display, a proximity sensor system, rear tail lights, navigation system and an audio system operably connected to a computer of the vehicle, wherein the improvement includes: at least one sensor positioned about the steering wheel of the vehicle capable of measuring heart rate when in contact with the driver; the at least one sensor operably connected to the computer for communicating the arteriolo-capillary pulse wave intervals of the driver to the computer in real-time; the computer, based upon the arteriolo-capillary pulse wave intervals received in real-time, determines whether a first pre-determined time interval has been exceeded; and, if the first pre-determined time interval has been exceeded, the computer will provide instructions to the driver.

In some aspects, the techniques described herein relate to an improved vehicle further including the computer, based upon the arteriolo-capillary pulse wave intervals received in real-time, determines whether a second pre-determined time interval has been exceeded; and, If the second pre-determined time interval has been exceeded, the computer will preform at least one selected from the group consisting of: activating the rear tail lights; switching control of the vehicle from the driver to the computer; and, discharging an inhalant medication within the vehicle cabin to treat the driver.

In some aspects, the techniques described herein relate to an improved vehicle in which the computer, upon determining the second pre-determined time interval has been exceeded, assumes control of the vehicle and maneuvers the vehicle to a location where the vehicle can safely be brought to a stop.

In some aspects, the techniques described herein relate to an improved vehicle in which the computer, subsequent to the second pre-determined time interval having been exceeded, determines the driver regains a pulse frequency below the first pre-determined time interval, will display and/or provide audible instructions for the driver to navigate to a hospital as selected by the computer based upon GPS location.

In some aspects, the techniques described herein relate to an improved vehicle in which the first pre-determined time interval is about 3 seconds.

In some aspects, the techniques described herein relate to an improved vehicle in which the second pre-determined time interval is about 6 seconds.

In some aspects, the techniques described herein relate to a vehicular steering wheel including: a photoplethysmography sensor located circumferentially about the steering wheel for communicating arteriolo-capillary pulse wave intervals to a vehicular computer.

DETAILED DESCRIPTION OF THE PREFERRED EMBODIMENT

The figures presented herein are for illustrative purposes and are not necessarily shown in correct proportion or scale.

Figure 1:
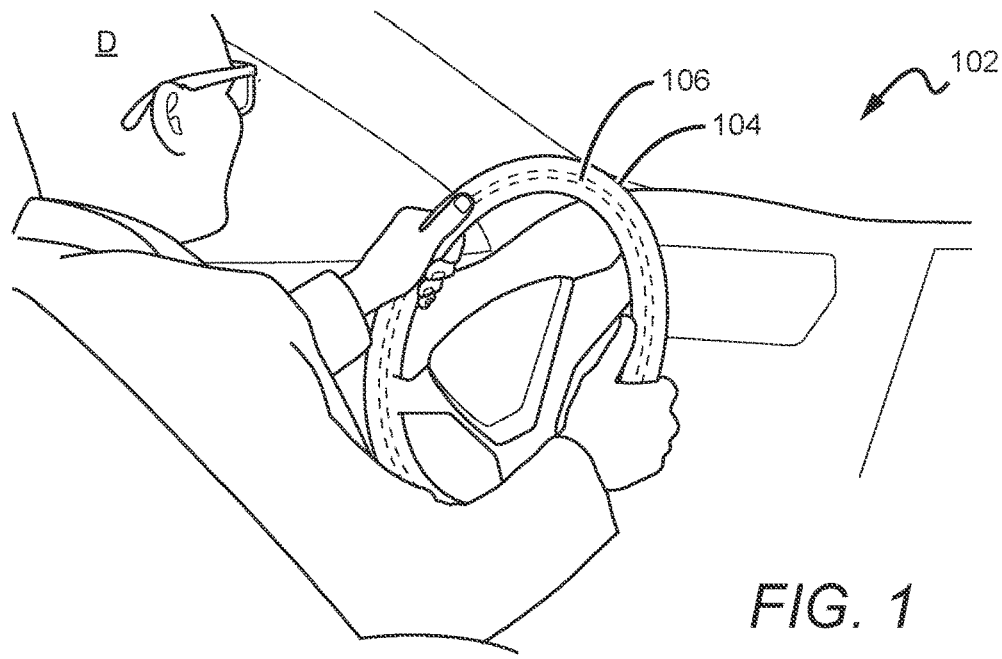
FIG. 1 is a view of a driver in a vehicle cabin having hands positioned about a steering wheel adapted with a heart rate sensor.

FIG. 1 illustrates the general position of a driver D seated within the vehicle cabin of a vehicle 102 while driving. Vehicle 102 has a proximity sensor system (not shown) that includes collision avoidance hardware, lane departure solutions and cameras. These systems as well as the vehicle lights (not shown), a video display (not shown) and sound system (not shown) are operably connected to an on-board computer of the vehicle.

Steering wheel 104 is adapted to include at least one sensor 106 as shown in broken line positioned circumferentially for communicating heart beat information with the on-board computer. Sensor 106 is preferably a photoplethysmography sensor and is designed so it will function if contacted by one of the driver's hands. Depending on the design of the steering wheel, it may be necessary for more than one sensor to be located on steering wheel 104 so that gripping the steering wheel with one hand anywhere on the steering wheel will activate sensor 106.

Figure 2:
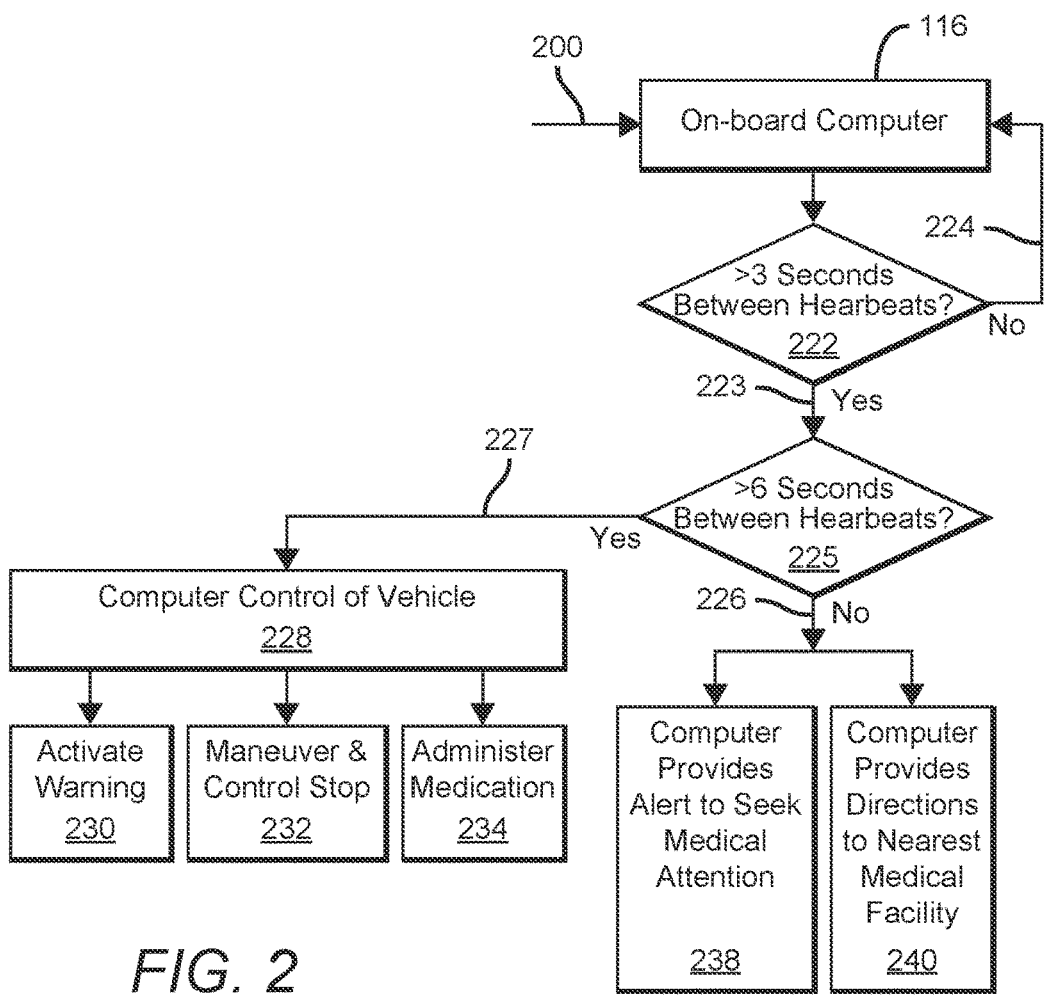
FIG. 2 is a diagram illustrating the computer decision sequence in response to the data received from the heart rate sensor.

Sensor 106 is connected to the on-board computer 116. While vehicles may have more than one computer, reference made to a computer is representative of the overall decision making process. FIG. 2 illustrates a flow diagram related to the functionality of computer 116 based on data received from sensor 106 and a method of use.

While driver D grips steering wheel 104, sensor 106 measures each consecutive arteriolo-capillary pulse wave intervals and the data is transmitted to computer 116 (step 200) and specifically, the time interval between each heart beat of the driver. Computer 116 determines if the time interval between the driver's arteriolo-capillary pulse wave intervals exceed a first pre-determined time interval of about three seconds (step 222), which would be indicative of the driver experiencing a pulseless condition. If no (step 224), computer 116 will continue to monitor. However, if the time interval between arteriolo-capillary pulse wave intervals is greater than 3 seconds (step 223), computer 116 next determines the severity of the pulseless condition, by determining if the time interval between the driver's arteriolo-capillary pulse wave intervals exceed a second pre-determined time interval of six seconds (step 225).

To eliminate false positives, which will occur if the driver does not have either hand on steering wheel 104 for more than three seconds, computer 116 can sense whether sensor 106 is not in contact with the driver's hand or can monitor the facial expression of the driver if a camera facing the driver is installed. If no contact is determined for a period such as two seconds, a warning will be communicated to the driver, either an audible or visual, to instruct the driver to place his hands back on steering wheel 104 and contact with sensor 106.

The computer determines whether the pulseless condition exceeds six seconds (step 225). If no (step 226), the computer will provide an alert (step 238). The alert can use the audio system to inform the driver of his condition and to seek medical attention or, the alert can be provided on a visual display screen or heads-up display if the vehicle is so equipped; or both audio and display. If the vehicle includes a navigation system, then the computer using mobile GPS location, can plot the direction to the nearest medical facility and provide directions to the driver (step 240).

If the computer determines a pulseless condition exceeding about six seconds (step 227), the computer will assume control of the vehicle (step 228) because of the driver's imminent loss of consciousness.

The function of computer 116 when a pulseless condition exceeding about six seconds is diagnosed is to alert individuals nearby of the condition of the driver and to take over control of the vehicle to stop the vehicle in the safest manner possible taking into account the surrounding traffic environment. For example, if the vehicle is traveling on a freeway and a pulseless condition exceeding about six seconds is determined by computer 116 (step 225), using the exterior sensors (not shown) positioned around vehicle 102, computer 116 will assume control of the vehicle (step 228) and activate a warning such as the rear tail lights in a pattern to alert individuals traveling behind of the condition of the driver (step 230). Computer 116 also assumes control of the vehicle using the vehicle's proximity sensor system and cameras, and will plot and execute a safe course, taking into account the proximity of other vehicles, to bring the vehicle to a stop on the side of the road (step 232).

Optionally, vehicle 102 can also be equipped for the discharge of an inhalant medication for inhalation by the driver (step 234). In the situation where a pulseless condition exceeding about six seconds is diagnosed, computer 116 can administer medication such as the release a volume of an inhalant such as ammonia vapor within the vehicle to cause an olfactory unconditional adrenergic reflex and prevent full loss of consciousness.

The invention claimed is:

1. A vehicle with a computer configured to diagnose whether a driver of a vehicle is experiencing a pulseless condition comprising:

a steering wheel adapted to include at least one photoplethysmography sensor located circumferentially on the steering wheel to communicate to the computer, arteriolo-capillary pulse wave intervals of the driver when the steering wheel is gripped by the driver, a proximity sensor system, a visual display, rear tail lights, navigation system and an audio system, wherein the steering wheel, at least one sensor, proximity sensor system, rear tail lights and audio system are each operably connected to the computer;

the computer determines whether the time interval between consecutive arteriolo-capillary pulse waves of the driver exceeds a first pre-determined time interval of between 3.0-3.5 seconds and provides notification that the first pre-determined time interval has been exceeded and instructions to navigate to a medical facility as selected by the computer based upon GPS location, the notification and instructions provided by audio, visual display, or both; and, the computer determines whether the time interval between consecutive arteriolo-capillary pulse waves of the driver exceeds a second pre-determined time interval of between 6.0-7.5 seconds whereby the computer will perform at least one selected from the group consisting of: activating the rear tail lights; switching control of the vehicle from the driver to the computer; and, discharging an inhalant medication to treat the driver.

2. An improved vehicle to be operated by a driver having a vehicle cabin and powered by an internal combustion engine, electric batteries, or both and which includes a steering wheel, a visual display, a proximity sensor system, rear tail lights, navigation system and an audio system operably connected to a computer of the vehicle, wherein the improvement comprises:

at least one sensor positioned about the steering wheel of the vehicle capable of measuring arteriolo-capillary pulse wave intervals when in contact with the driver; the at least one sensor operably connected to the computer for communicating the arteriolo-capillary pulse wave intervals of the driver to the computer in real-time for determining whether the time interval between consecutive arteriolo-capillary pulse waves of the driver exceeds a first pre-determined time interval of between 3.0-3.5 seconds whereby instructions will be provided by the computer to the driver; and, thereafter, the computer will determine whether the time interval between consecutive arteriolo-capillary pulse waves of the driver exceeds a second pre-determined time interval of between 6.0-7.5 seconds whereby the computer will perform at least one selected from the group consisting of: activating the rear tail lights, switching control of the vehicle from the driver to the computer, discharging an inhalant medication within the vehicle cabin to treat the driver.

3. The improved vehicle of claim 2 in which the computer, upon determining the second pre-determined time interval has been exceeded, assumes control of the vehicle and maneuvers the vehicle to a location where the vehicle can safely be brought to a stop.

4. A vehicle to be operated by a driver having a vehicle cabin and powered by an internal combustion engine, electric batteries, or both and which includes a steering wheel, a visual display, a proximity sensor system, rear tail lights, navigation system and an audio system operably connected to a computer of the vehicle, wherein the improvement comprises:

at least one sensor positioned about the steering wheel of the vehicle capable of measuring arteriolo-capillary pulse wave intervals when in contact with the driver; the at least one sensor operably connected to the computer for communicating the arteriolo-capillary pulse wave intervals of the driver to the computer in real-time for determining whether the time interval between consecutive arteriolo-capillary pulse waves of the driver exceeds a first pre-determined time interval of between 3.0-3.5 seconds whereby information will be provided by the computer to the driver via visual display, audible sound, or both; and, thereafter, the computer will determine whether the time interval between consecutive arteriolo-capillary pulse waves of the driver exceeds a second pre-determined time interval of between 6.0-7.5 seconds whereby the computer will perform at least one selected from the group consisting of: activating the rear tail lights, switching control of the vehicle from the driver to the computer, discharging an inhalant medication within the vehicle cabin to treat the driver.

* * * * *